United States Patent
Kuribayashi et al.

(10) Patent No.: US 6,456,576 B1
(45) Date of Patent: Sep. 24, 2002

(54) OPTICAL RECORDING METHOD

(75) Inventors: Isamu Kuribayashi, Tokyo (JP); Naoki Hayashida, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/694,323

(22) Filed: Oct. 24, 2000

(30) Foreign Application Priority Data

Nov. 17, 1999 (JP) ............................................ 11-327520

(51) Int. Cl.⁷ ................................................. G11B 7/00
(52) U.S. Cl. .................. 369/47.53; 369/53.1; 369/59.11
(58) Field of Search ........................... 369/47.1, 47.11, 369/53.1, 53.11, 53.31, 53.2, 53.37, 53.26, 59.1, 59.11, 59.12, 116, 47.53

(56) References Cited

U.S. PATENT DOCUMENTS 6,275,462 B1 * 8/2001 Masaki et al. ............... 369/116

FOREIGN PATENT DOCUMENTS

JP 8-124165 5/1996

* cited by examiner

Primary Examiner—Muhammad Edun
(74) Attorney, Agent, or Firm—Oblon, Spivak, McClelland, Maier, & Neustadt, P.C.

(57) ABSTRACT

A method for recording a phase change optical recording medium under optimal conditions is provided. In the recording of a phase change optical recording medium which has a phase change recording layer and which has a data recording area and a test write area, the test write area is recorded before the recording of the data recording area, and the recording of the test write area is conducted corresponding to the recording history of the data recording area in order to determine optimal writing and erasing conditions for the data recording area on the basis of the quality of the read-out signal of the test write area.

4 Claims, 1 Drawing Sheet

OPTICAL RECORDING METHOD

BACKGROUND OF THE INVENTION

1. Field of the Invention

This invention relates to a method for recording an optical recording medium of phase change type.

2. Prior Art

Highlight is recently focused on optical recording media capable of recording information at a high density and erasing the recorded information for overwriting. One typical overwritable optical recording medium is phase change optical recording medium wherein a laser beam is directed to the recording layer to change its crystalline state whereupon a change in reflectance by the crystallographic change is detected for reading of the information.

The phase change optical recording media are of great interest since the medium can be overwritten by modulating the intensity of a single laser beam and the optical system of the drive unit is simple.

The recording of information on the optical recording medium of phase change type is generally accomplished as described below. First, the recording layer as deposited in amorphous state is initialized (crystallized). In the recording, a laser beam of high power (recording power) capable of heating the recording layer to a temperature higher than the melting point is applied. In the region where the recording power is applied, the recording layer is melted and thereafter quenched to form an amorphous record mark. In the erasure of the record mark, a laser beam of the power (erasing power) capable of heating the recording layer to a temperature higher than the crystallization temperature and lower than the melting temperature is applied. The record mark to which the laser beam of erasing power is applied is heated to a temperature higher than the crystallization temperature and then allowed to slowly cool to recover the crystalline state. Accordingly, in the optical recording media of the phase change type, the medium can be overwritten by modulating the intensity of a single light beam.

Optical recording media are subject to conditions such as deterioration over time of the medium or the semiconductor light emitting device, loss of sensitivity by dust deposition, and alteration of the light power. Accordingly, test writing is generally conducted before the recording of the medium in order to enable the recording under optimal conditions by correcting such conditions. In standardized optical recording media, provision of a test write area in a part of the medium is defined in the Media Format, and the method adopted therein comprises the steps of recording the test write area with the record power being altered; determining the optimal record power on the bases of the read-out signal obtained during the test write operation, and effecting the recording of the data recording area using the thus determined optimal record power.

Japanese Patent Application Kokai No. (JP-A) 124165/1996 describes need of the test write in the phase change recording medium. However, also described is the situation that the algorithm that has been used for the detection of the optimal power needs modification if they are to be used in the phase change optical medium wherein the recording conditions are determined by two or more power levels, and that the test write method is not yet established for the phase change optical recording medium. In order to obviate such problem, JP-A 124165/1996 proposes a method for determining optimal recording and erasing powers of the semiconductor light emitting device wherein the test write operations are conducted either simultaneously or independently altering the recording power and the erasing power of the semiconductor light emitting device at respectively predetermined alteration rates.

As described above, overwrite recording of a phase change optical recording medium is conducted by modulating the power between the recording power and the erasing power. The inventors of the present invention have found that the optimal recording conditions differ by the time elapsed before the overwriting operation since the previous recording. In other words, the inventors of the present invention have found that, in the overwriting of the phase change optical recording medium, the optimal recording conditions are different depending on the recording history of the medium.

JP-A 124165/1996, however, does not disclose any means for determining the optimal recording conditions in correspondence with the recording history.

SUMMARY OF THE INVENTION

An object of the present invention is to provide a method for recording a phase change optical recording medium under optimal conditions.

Such objects are attained by the present invention as described in (1) to (3), below.

(1) A method for recording an optical recording medium which has a phase change recording layer and which has a data recording area and a test write area, wherein the test write area is recorded before the recording of the data recording area, and the recording of the test write area is conducted corresponding to the recording history of the data recording area in order to determine optimal writing and erasing conditions for the data recording area on the basis of the quality of the read-out signal of the test write area.

(2) The optical recording method according to the above (1) wherein interval between the overwriting operations of the test write area is set to be consistent with the interval between the overwriting operations of the data recording area.

(3) The optical recording method according to the above (1) or (2) wherein, in recording the unrecorded area of the data recording area, recording in the unrecorded area of the test write area is conducted before the recording of the data recording area; and upon recording of the recorded area in the data recording area, recording in the recorded area of the test write area is conducted before the recording of the data recording area.

DETAILED DESCRIPTION OF THE INVENTION

Figure 1:
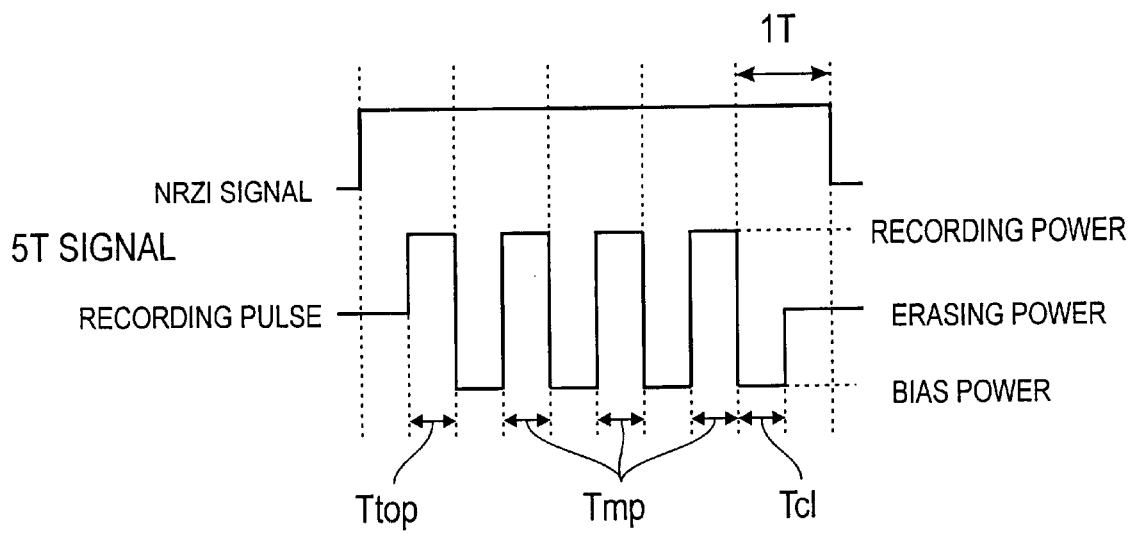
FIG. 1 is a schematic view showing the recording waveform used for overwriting of the phase change optical recording medium of the present invention.

The recording method of the present invention is applicable to an optical recording medium which has a phase change recording layer and which has a data recording area and a test write area. The term "data recording area" designates the area where the data is recorded by the user. In the case of CD-RW which is a phase change optical recording medium that has already been standardized, a PCA (Power Calibration Area) is provided as the test write area.

In the present invention, the test write area is recorded before the recording of the data recording area in correspondence with the recording history of the data recording area, and optimal recording and erasing conditions are determined on the basis of the quality of the read-out signal in the test write area.

First, the reason why the recording of the test write area should be conducted in correspondence with the recording history of the data recording area is explained.

An example of the recording history which is preferably consulted in the present invention is the time interval from the previous recording event. The inventors of the present invention have found that the optimal recording conditions of the overwriting operation differ depending on the time that has elapsed from the previous overwriting operation (interval between the overwriting operation). Accordingly, it is preferable in the present invention to consult the time interval from the previous recording event as the recording history. It is also preferable to consider whether the recording operation of interest is the initial recording operation or an overwriting operation since the recording conditions differ depending on whether the recording operation is the first-time recording of the as-initialized recording layer or an overwriting operation of the already-recorded recording layer.

Next, the experiment conducted by the inventors of the present invention which shows the dependence of the optimal recording conditions on the recording history is described.

In this experiment, a substrate in the form of a land/groove double spiral disc having a diameter of 120 mm and a thickness of 0.6 mm was prepared by injection molding polycarbonate. Grooves were simultaneously formed in the injection molding of the substrate to a depth of 20 nm and width of 0.2 μm at a pitch of 0.74 μm. On the grooved surface of the substrate, there were formed a first dielectric layer, a recording layer, a second dielectric layer, a reflective layer, and a protective layer by the procedure as described below to produce the optical recording disc samples.

The first dielectric layer was formed by sputtering in argon atmosphere using ZnS (85 mol %)-SiO$_2$ (15 mol %) for the target. The first dielectric layer was formed to a thickness of 90 nm.

The recording layer was formed by sputtering. The target had a composition (atomic ratio) of:

$(In_aAg_bTe_{1-a-b})_{1-c}Sb_c$ wherein
a=0.1,
b=0.15, and
c=0.6.

The recording layer was formed to a thickness of 20 nm.

The second dielectric layer was formed by sputtering in argon atmosphere using ZnS (85 mol %)-SiO$_2$ (15 mol %) for the target. The second dielectric layer was formed to a thickness of 30 nm.

The reflective layer was formed by sputtering in argon atmosphere using Al-1.7 at % Cr for the target. The reflective layer was formed to a thickness of 100 nm.

The protective layer was formed by applying a UV curable resin by spin coating and exposing it to UV for curing. The protective layer after curing had a thickness of 5 μm.

The recording layer of the thus produced sample was initialized by a bulk eraser and the sample was placed on an optical recording medium evaluator (DDU-1000, manufactured by Pulstec). The sample was written and read under the conditions as described below:

Laser beam wavelength: 635 nm
Numerical aperture, NA: 0.6
Recorded signal: random signal of EFM p1 Linear velocity: 3.5 m/s to thereby determine the optimal values for the parameters of the recording pulse strategy, the optimal value of the recording power, and the optimal value of erasing power.

Next, recording pulse strategy is described. A medium wherein record marks are formed in heat mode as in the case of a phase change optical recording medium is generally recorded, not by continuously irradiating the medium with the laser beam of the recording power for the duration corresponding to the length of the record mark, but by irradiating the medium with the laser beam divided in a pulse train comprising a plurality of pulses for the control of the record mark shape as described in JP-A 150230/1989. Constitution of the pulse division in such a case is generally referred to as the recording pulse strategy. The recording pulse strategy used in the experiment is shown in FIG. 1 wherein a typical recording pulse train corresponding to 5T signal of NRZI signal is illustrated. In FIG. 1, $T_{top}$ represents width of the top pulse, $T_{mp}$ represents width of the pulses other than the top pulse (which are also referred to as multi-pulse), and $T_{cl}$ represents width of the downward pulse (also referred to as the cooling pulse) after the last pulse. Such pulse width is generally indicated by the value normalized with standard clock width (1T). In this recording pulse strategy, power between the pulses (bias power) is set at a value lower than the erasing power. It should be noted that, in this pulse strategy, pulse number of nT signal was set at n−2.

The optimal values for the recording pulse strategy, the recording power and the erasing power are the values at which the clock jitter is minimized. The clock jitter is evaluated by measuring the read-out signal with a time interval analyzer, and calculating

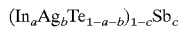

$\sigma/T_w$ (%)

wherein the window width is $T_w$. The clock jitter is fluctuation by time of the read-out signal at the frequency corresponding to the standard clock width (1T).

The optimal recording conditions (the conditions at which the clock jitter is minimized) determined for this sample were:

recording power: 12 mW,
erasing power: 6 mW,
bias power: 0.5 mW,
$T_{top}$: 0.5T,
$T_{mp}$: 0.3T, and
$T_{cl}$: 0.6T
and the clock jitter was 8% when the recording was conducted under such conditions. This set of conditions is the optimal conditions for recording the unrecorded area (initial recording), and hereinafter referred as the initial optimal conditions.

The influence of the recording history on the clock jitter was evaluated for this sample.

First, an experiment for successive overwriting operations was conducted. In this experiment, two successive writing operations were conducted on the unrecorded area of the sample under the initial optimal conditions (the second writing operation was an overwriting operation). The interval between the two successive writing operations was 1 second. The clock jitter measured after the second writing operation was 9.5%. Next, an experiment for successive overwriting operations with a longer time interval was conducted. In this experiment, the unrecorded area of the sample was written once under the initial optimal conditions on 2 days after the first writing operation, and the same area was overwritten after two days under the initial optimal conditions. The clock jitter was 10%. In contrast, when the overwriting operation two days after the first writing operation was conducted under the conditions wherein the recording power and the erasing power were increased by 1 mW, the clock jitter was reduced to 9%. As demonstrated by such results, the optimal writing conditions of the overwriting operation is influenced by the time interval from the previous writing operation.

It should also be noted that, when $T_{mp}$ in the second writing operation 1 second after the first operation was increased from 0.3T to 0.4T, the clock jitter was 9%, which is a value better than the case when two successive writing operations were conducted under initial optimal conditions. As demonstrated by such results, the optimal writing conditions are different depending on whether the operation is the initial writing operation or the second (i.e. overwriting) operation.

Another experiment for successive overwriting operations was conducted. In this experiment, ten successive writing operations were conducted in the unrecorded area of the sample under the initial optimal conditions (the second to the tenth writing operations were overwriting operations). The interval between the overwriting operations was 1 second. The clock jitter measured after the tenth writing operation was 9%. Next, an experiment for overwriting operation with a longer time interval was conducted. In this experiment, the sample which had been subjected to ten successive writing operations as described above was written once under the initial optimal conditions after 2 days from the ten successive writing operations. The clock jitter was 10%. In contrast, when the overwriting operation after two days from the ten successive writing operations was conducted under the same initial optimal conditions except for the erasing power increased by 1 mW, the clock jitter was 9.5%. In addition, when the overwriting operation after two days form the ten successive writing operations was conducted under the same initial optimal conditions except for the recording power increased by 1 mW, the clock jitter was 9.4%. This result also indicates that the optimal writing conditions of the overwriting operation is influenced by the time interval from the previous writing operation.

The results of the experiments as described above also indicate that the influence of the time interval from the previous writing operation is present irrespective of the number of overwriting operations preceding the previous writing operation.

As evident from the experimental results, the test write operation should be conducted under the conditions corresponding to the recording history of the data recording area.

Preferably, the test write operation corresponding to the recording history of the data recording area is conducted by the exemplary procedure as described below.

The medium to be recorded has a data recording area which is controlled by dividing the area into units such as tracks and sectors, and the entire data recording area is the unrecorded area which has experienced no writing operation after its initialization. In this case, the entire test write area is also unrecorded.

When the data recording area is recorded for the first time (initial writing operation), the optimal recording conditions for the initial writing operation are preliminarily determined by conducting test writing in the test write area under different conditions. The data recording area is then recorded under the thus determined optimal recording conditions, and also, either before or after such recording operation, the test write area (the area which has experienced no test writing) is recorded under the same optimal recording conditions so that the recording history (number of the recording operations) of the test write area matches with that of the data recording area.

Next, the procedure in the case of the second writing (overwriting) operation in the data recording area is described. In this case, test writing (overwriting) is conducted in the area which has already experienced one writing operation (and not the area used for the test writing in the initial recording operation) under different conditions to thereby determine the optimal overwriting conditions. The data recording area is then recorded under the thus determined optimal recording conditions, and also, either before or after such recording operation, the test write area (the area which has experienced no test writing) is recorded under the same optimal recording conditions so that the recording history (number of recording operations) of the test write area matches with that of the data recording area.

Next, the procedure in the case of the third writing (second overwriting) operation in the data recording area is described. In this case, test writing (overwriting) is conducted in the area which has already experienced two writing (i.e. one writing and one overwriting) operations (and not the area used for the test writing in the previous recording operations) under different conditions to thereby determine the optimal overwriting conditions. The data recording area is then overwritten for the second time under the thus determined optimal recording conditions, and also, either before or after such recording operation, the test write area (the area which has experienced no test writing) is overwritten for the second time under the same optimal recording conditions so that the recording history (number of recording operations) of the test write area matches with that of the data recording area.

When the data recording area is overwritten three or more times, the test writing and the matching of the recording history may be carried out in accordance with the case of the two overwriting operations.

In some cases, the recording of the data recording area extends over more than one areas to result in more than one overwriting intervals. The method of the present invention is also applicable to such a case. When more than one recorded areas each having different recording histories are formed in the data recording area, the test write area may be divided into two or more areas, and the recording histories of the recorded areas of the data recording area can be maintained in each of such divided areas.

Next, procedure for determining the optimal recording conditions in the test write area is described. As described in the foregoing, the phase change optical recording medium is recorded by modulating the power between the recording power and the erasing power to thereby enable the overwriting. Therefore, as described in JP-A 124165/1996, the test writing may be accomplished by simultaneously altering the recording power and the erasing power at the predetermined alteration rate, or by independently altering the recording power and the erasing power to thereby determine the optimal recording power and the optimal erasing power to enable use of such powers in combination as the optimal recording conditions. The determination of the optimal conditions may also be conducted through the test writing by simultaneously altering at least one of the recording power and the recording pulse strategy with the erasing power; or by independently altering at least one of the recording power and the recording pulse strategy with the erasing power. It should be noted that alteration of the recording pulse strategy means alteration of width of the pulses constituting the pulse train, pulse interval, power level between the pulses, and the like. When the power of the pulses in the pulse divided recording is set at one particular value, the particular power used will be the recording power. It is, however, also possible to independently set different power levels to the respective pulses.

The present invention is applicable to the phase change optical recording media in general with no particular limitation. The present invention, however, is particularly preferable for use in the medium having a recording layer of Ge—Sb—Te-based composition or In—Ag—Te—Sb-based composition.

When the phase change material is of the Ge—Sb—Te-based composition as represented by the formula (I):

$$Ge_aSb_bTe_{1-a-b} \tag{I}$$

atomic ratio of the constituent elements is preferably such that:

$0.08 \leq a \leq 0.35$, and $0.12 \leq b \leq 0.40$.

When the phase change material is of the In—Ag—Te—Sb-based composition as represented by the formula (II):

$$[(In_aAg_bTe_{1-a-b})_{1-c}Sb_c]_{1-d}M_d \tag{II}$$

atomic ratio of the constituent elements is preferably such that:

$0.1 \leq a \leq 0.3$, $0.1 \leq b \leq 0.3$, $0.5 \leq c \leq 0.8$, and $0 \leq d \leq 0.10$.

It should be noted that element M is at least one element selected from H, Si, C, V, W, Ta, Zn, Ti, Ce, Tb, Ge, Sn, Pb and Y.

MERITS OF THE INVENTION

The present invention has enabled to determine the optimal recording conditions for recording a phase change optical recording medium at an improved accuracy by talking recording history into consideration.

What is claimed is:

1. A method for recording an optical recording medium which has a phase change recording layer and which has a data recording area and a test write area, comprising the steps of:

recording the test write area before recording the data recording area, and applying a recording power to the test area according to a recording history of the data recording area in order to determine optimal writing and erasing conditions for the data recording area on the basis of the quality of the readout signal of the test write area, said recording history comprising:

whether a previous step of recording a data recording area was performed.

2. The method according to claim 1 wherein a time interval between overwriting operations of the test write area is set to be consistent with a time interval between overwriting operations of the data recording area.

3. The optical recording method according to claim 1 wherein, in recording an unrecorded area of the data recording area, recording in an unrecorded area of the test write area is conducted before the recording of the data recording area; and upon recording of a recorded area in the data recording area, recording in a recorded area of the test write area is conducted before the recording of the data recording area.

4. The method according to claim 1, wherein the step of recording comprises a step selected from the group consisting of first-time recording of an as-initialized recording layer and overwriting of an already-recorded layer.

* * * * *